United States Patent
Moriwaki et al.

(10) Patent No.: US 6,875,505 B2
(45) Date of Patent: Apr. 5, 2005

(54) MAGNETIC RECORDING MEDIUM

(75) Inventors: Kenichi Moriwaki, Kanagawa (JP); Kazuyuki Usui, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/442,940

(22) Filed: May 22, 2003

(65) Prior Publication Data

US 2003/0219629 A1 Nov. 27, 2003

(30) Foreign Application Priority Data

May 23, 2002 (JP) .................................... P.2002-149407

(51) Int. Cl.⁷ .............................. G11B 5/66; G11B 5/70; H01J 1/00
(52) U.S. Cl. ................ 428/332; 428/611; 428/694 TS; 428/694 TM; 428/694 SG; 428/900
(58) Field of Search .................... 428/694 TS, 694 TM, 428/611, 900, 332, 694 SG

(56) References Cited

U.S. PATENT DOCUMENTS

2003/0180577 A1 * 9/2003 Do et al. ............. 428/694 TM

FOREIGN PATENT DOCUMENTS

| JP | 5-73880 A | 3/1993 |
| JP | 7-311929 A | 11/1995 |
| JP | 2001-56921 A | 2/2001 |

* cited by examiner

Primary Examiner—Holly Rickman
(74) Attorney, Agent, or Firm—Sughrue Mion, PLLC

(57) ABSTRACT

A magnetic recording medium comprising a flexible support, a first recording layer, an intermediate layer and a second recording layer in this order, wherein the second recording layer comprises a ferromagnetic metal alloy comprising Co, Pt and Cr, and a nonmagnetic oxide.

18 Claims, 1 Drawing Sheet

MAGNETIC RECORDING MEDIUM

FIELD OF THE INVENTION

The present invention relates to a magnetic recording medium for digital data recording.

BACKGROUND OF THE INVENTION

With the spread of Internet in recent years, the use form of the computer has been changed, e.g., to the form of processing a great volume of moving picture data and sound data with a personal computer. Along with this trend, storage capacity required of magnetic recording media, such as hard discs, has increased.

In a hard disc apparatus, a magnetic head slightly floats from the surface of a magnetic disc with the rotation of the magnetic disc and magnetic recording is performed by non-contact recording. This mechanism prevents the magnetic disc from breaking by the contact of the magnetic head and the magnetic disc. With the increase of density of magnetic recording, the floating height of the magnetic head is gradually decreased, and now the floating height of from 10 to 20 nm has been realized by using a magnetic disc comprising a specularly polished hyper-smooth glass support having provided thereon a magnetic recording layer. In a magnetic recording medium, a CoPtCr series magnetic layer and a Cr undercoat layer are generally used, and the direction of easy magnetization of the CoPtCr series magnetic layer is controlled in the direction of in-plane of the film by the Cr undercoat layer by increasing the temperature as high as 200 to 500° C. Further, the magnetic domain in the magnetic layer is segregated by accelerating the segregation of Cr in the CoPtCr series magnetic layer. Areal recording density and recording capacity of hard disc drive have markedly increased during the past few years by technological innovation, e.g., the floating height reduction of the head, the improvement of the structure of head, and the improvement of the recording film of disc.

With the increase of throughput of digital data, there arises a need of moving a high capacity data, such as moving data, by recording on a replaceable medium. However, since the support of a hard disc is made of a hard material and the distance between head and disc is extremely narrow as described above, there is the fear of happening of accident by the collision of head and disc, and entraining dusts during operation when a hard disc is used as a replaceable medium such as a flexible disc and a rewritable optical disc, and so a hard disc cannot be used. Further, widespread in-plane recording media confront a problem, such as instability of recording signals due to thermal fluctuation in further higher density recording.

As the means for solving these problems, a magnetic recording medium provided with a magnetic layer on switching layer structure is proposed. The signal recorded on the magnetic layer can be diminished the influence of thermal fluctuation even in higher density recording, since the magnetic signal is stabilized by switched connection as compared with the signal recorded on an ordinary in-plane recording medium. As such a technique, the method disclosed, e.g., in JP-A-2001-56921 (the term "JP-A" as used herein means an "unexamined published Japanese patent application") can be used. However, when a flexible polymer support is used as the support, not only high temperature cannot be used in magnetic layer-forming but Ru or the like used in the switching layer is great in film stress, thus the support deforms.

Further, when a high temperature sputtering film-forming method is used in manufacturing a magnetic recording medium, not only productivity is poor but the cost in mass production increases, thus the magnetic recording medium cannot be manufactured inexpensively.

On the other hand, a flexible disc comprises a flexible polymer film support and is excellent in replaceability, since it is a medium capable of contact recording, and so the disc can be produced inexpensively. However, commercially available flexible discs nowadays have such a structure that the recording layer is formed by coating a magnetic substance on a polymer film together with a polymer binder and an abrasive. Therefore, the high density recording characteristics of the magnetic layer of flexible discs are inferior to those of hard discs having a magnetic layer formed by sputtering, and the achieved recording density of flexible discs is only 1/10 or less of that of hard discs.

Accordingly, a ferromagnetic metal thin film flexible disc having a recording layer formed by the same sputtering method as in hard discs is suggested. However, when the same magnetic layer as that of hard discs is tried to be formed on a polymer film, the polymer film is greatly damaged by heat and it is difficult to put such a flexible disc to practical use. Further, since the contact of a head with a medium is inevitable, a hard protective layer is indispensable. Therefore, it is also suggested to use highly heat resisting polyimide and aromatic polyamide films as the polymer films, but these heat resisting films are very expensive and it is also difficult to put them to practical use. When a magnetic layer is tried to be formed with cooling so as not to give thermal damage to the polymer films, the magnetic characteristics of the magnetic layer are insufficient, thus recording density can be hardly improved.

On the other hand, it has come to be known that when a ferromagnetic metal thin film comprising a ferromagnetic metal alloy and a nonmagnetic oxide is used, almost the same magnetic characteristics as those of the CoPtCr series magnetic layer formed under a condition of from 200 to 500° C. can be obtained even when a recording layer is formed under room temperature. Such a ferromagnetic metal thin film comprising a ferromagnetic metal alloy and a nonmagnetic oxide has a so-called granular structure which is proposed in hard discs, and those disclosed in JP-A-5-73880 and JP-A-7-311929 can be used. Nevertheless, the problem of thermal fluctuation remains unsolved in higher density recording.

In direct read after write (write-once read-many) type and rewritable optical discs represented by DVD-R/RW, the head and the disc are not close to each other as in a magnetic disc, therefore they are excellent in replaceability and widespread. However, from the thickness of light pickup and economical viewpoints, it is difficult for optical discs to use such a disc structure that both surfaces can be used as recording surfaces as in a magnetic disc, which is advantageous for improving capacity. Further, optical discs are low in areal recording density and data transfer speed as compared with magnetic discs, and so their performance is not sufficient yet as rewritable high capacity recording media.

As described above, rewritable replaceable high capacity recording media which satisfy performance, reliability and economic requirement are not found yet, although there is a great demand for them.

SUMMARY OF THE INVENTION

The present invention has been done in the light of the points at issue of the prior art technique, and an object of the present invention is to provide a high capacity magnetic recording medium which has high performance, high reliability and is inexpensive.

The above object of the invention can be achieved by a magnetic recording medium comprising a flexible support having provided at least on one side a first recording layer, an intermediate layer and a second recording layer in this order, wherein the second recording layer comprises a ferromagnetic metal alloy containing Co, Pt and Cr, and a nonmagnetic oxide.

That is, the magnetic recording medium in the present invention is provided with a ferromagnetic metallic thin film recording layer comprising a ferromagnetic metal alloy containing Co, Pt and Cr, and a nonmagnetic oxide, therefore, the medium can be used for high density recording such as a hard disc and recording capacity can be improved. Such a ferromagnetic metal thin film comprising a ferromagnetic metal alloy containing Co, Pt and Cr and a nonmagnetic oxide has a so-called granular structure which is proposed in hard discs, and those disclosed in JP-A-5-73880 and JP-A-7-311929 can be used.

Further, by providing an intermediate layer having a low film stress between a first recording layer and a second recording layer, the stability of recording signal of minute dots is heightened, thus the problem of thermal fluctuation which is a problem in high density recording can be solved.

By using these first recording layer, intermediate layer and second recording layer, heating of the support as conventionally performed becomes unnecessary, and a magnetic recording medium which can achieve good magnetic characteristics and solve the problem of thermal fluctuation can be obtained even when the temperature of the support is room temperature. Accordingly, the support is not damaged by heat even when the support is a polymer film not a glass support or an Al support, and the invention can also provide a flat magnetic tape and flexible disc which are resistive to contact recording.

Description of Reference Numerals

Figure 1:
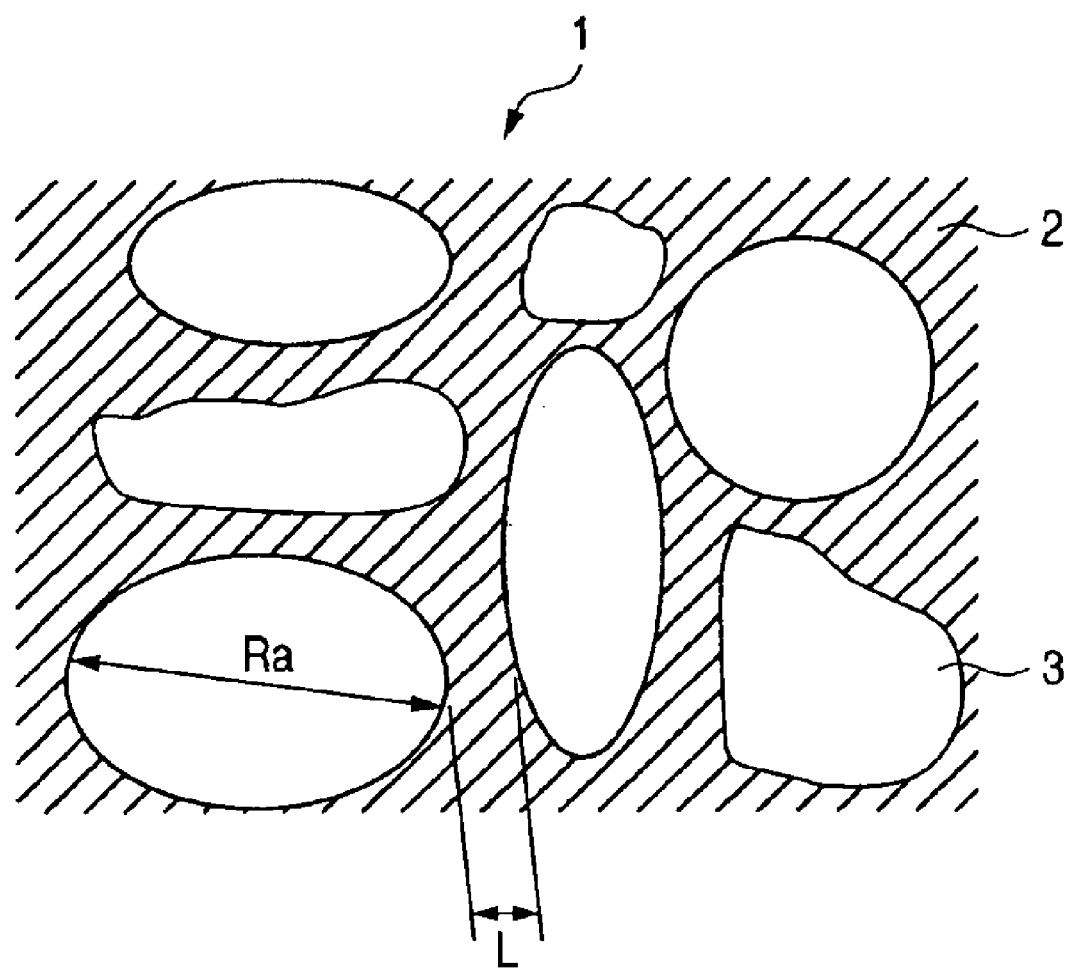
FIG. 1 is a drawing showing a part of the section of one example of a recording layer cut in parallel to the in-plane.

1: Recording layer
2: Nonmagnetic oxide
3: Magnetic metal alloy fine particle

DETAILED DESCRIPTION OF THE INVENTION

The mode for carrying out the invention is described in detail below.

The support of the magnetic recording medium of the invention is a flexible support, and using a flexible polymer film is more preferred in the point of productivity. Supports of a tape form and a flexible disc form can be used in the present invention. The flexible disc of the invention using a flexible polymer film support has a structure having a center hole at the core part, and is encased in a plastic cartridge. The cartridge is generally equipped with an access window covered with a metallic shutter. Recording of signal on the flexible disc and reproduction are performed by introducing a magnetic head through the access window.

The magnetic recording medium of the invention comprises a flexible support having provided thereon a first recording layer, an intermediate layer and a second recording layer. It is preferred that the magnetic recording medium is constituted by lamination on the support in the order of a subbing layer for improving a surface property and a gas barrier property, an electrically conductive layer having functions of adhesion, crystal orientation and electric conduction, an undercoat layer for controlling the crystal orientation of a magnetic layer, a first recording layer, an intermediate layer, a second recording layer, a protective layer for protecting a magnetic layer from corrosion and abrasion, and a lubricating layer for improving running durability and corrosion resistance. A disc-like magnetic recording medium is generally provided with each of the above layers on both surfaces of a flexible support. A tape-like medium is generally provided with each of the above layers on one surface of a support, but these layers may be provided on both surfaces. A first recording layer and a second recording layer are also generally called a recording layer.

A recording layer using a in-plane magnetic recording layer which is now the main current in a hard disc and a tape is preferred to build in a system. The direction of the axis of easy magnetization can be controlled by the materials and crystal structures of an undercoat layer and an intermediate layer, and the composition and the film-forming conditions of a magnetic layer.

A recording layer comprises, as described above, a ferromagnetic metal alloy containing Co and a nonmagnetic oxide. A ferromagnetic metal alloy and a nonmagnetic oxide are mixed in a macroscopic meaning, but they form such a structure that a nonmagnetic oxide covers ferromagnetic metal alloy fine particles, or separate structure, such as the state of islands, in a microscopic meaning. Apart of the section of a recording layer cut in parallel to the in-plane is shown in FIG. 1. The size of a ferromagnetic metal alloy fine particle (the longest length) Ra is from 1 to 110 nm or so, and the distance L between particles is from 1 to 110 nm or so, but the case where L is locally 0 is also allowable.

By taking such a structure, high retention can be achieved and the dispersibility of magnetic particle sizes becomes uniform, so that a low noise recording medium can be obtained.

As ferromagnetic metal alloys containing Co, Pt and Cr, alloys of Co, Pt and Cr with at least one element selected from Ni, Fe, B, Si, Ta, Nb, Ru and the like can be used. Taking recording characteristics into consideration, Co—Pt—Cr, Co—Pt—Cr—Ta and Co—Pt—Cr—B are particularly preferred.

As nonmagnetic oxides, oxides of Si, Zr, Ta, B, Ti, Al, Cr, Ba, Zn, Na, La, In and Pb can be used but silicon oxide is most preferably used taking recording characteristics into consideration.

The proportion of a ferromagnetic metal alloy containing Co, Pt and Cr to a nonmagnetic oxide, i.e., ferromagnetic metal alloy/nonmagnetic oxide is preferably from 95/5 to 80/20 (atomic ratio), and particularly preferably from 90/10 to 85/15. When the ratio of a ferromagnetic metal alloy is more than this range, separation among magnetic particles becomes insufficient and retention lowers. Contrary to this, when the proportion of a ferromagnetic metal alloy is less than this range, signal output conspicuously decreases due to the reduction of the amount of magnetization.

The thickness of a second recording layer comprising a ferromagnetic metal alloy containing Co, Pt and Cr and a nonmagnetic oxide, or further the thickness of a first recording layer, is preferably from 10 to 60 nm, and more preferably from 20 to 40 nm. When the thickness is more than this range, noise increases markedly, and when the thickness is less than this range, output conspicuously lowers.

The methods which can be used for forming a recording layer comprising a ferromagnetic metal alloy containing Co, Pt and Cr and a nonmagnetic oxide include vacuum film-forming methods, e.g., a vacuum evaporation method and a sputtering method. Above all, a sputtering method is particularly preferably used in the present invention, since a thin film having a good quality can be easily formed. As the sputtering method, any of well-known DC sputtering method and RF sputtering method can be used. In sputtering methods, a web sputtering apparatus of continuously forming a layer on a continuous film is preferably used, further, a batch sputtering system and an in-line sputtering system as used in the manufacture of a hard disc can also be used.

As sputtering gases in sputtering, ordinarily used argon gas can be used, but other rare gases may also be used. A trace amount of oxygen gas may be introduced for the purpose of adjusting the oxygen content in a nonmagnetic oxide or for surface oxidation.

For forming a magnetic layer comprising a ferromagnetic metal alloy containing Co, Pt and Cr and a nonmagnetic oxide by sputtering methods, it is also possible to use two kinds of a ferromagnetic metal alloy target and a nonmagnetic oxide target by a co-sputtering method of them. However, for the purpose of improving the dispersibility of magnetic particle sizes to thereby form a homogeneous film, it is preferred to use an alloy target of a ferromagnetic metal alloy containing Co, Pt and Cr and a nonmagnetic oxide. The alloy target can be formed by a hot press method.

By taking the layer structure of a first recording layer/an intermediate layer/a second recording layer, recording and reproduction are directly performed on a second recording layer by heads, contrary to this, signals subjected to magnetic flux revolution are recorded on a first recording layer partitioned off by an intermediate layer. That is, since the first recording layer and the second recording layer form dia-ferromagnetic connection, recording signals are maintained stably by exchange interaction. Accordingly, magnetic fluctuation by contiguous signals happens with difficulty, and so sufficient recording characteristics can be obtained even in signals of high density recording.

The composition of an intermediate layer preferably has high magnetic permeability, for example, Mn alloys e.g., IrMn, PdMn, PtMn, FeMn and NiMn, Ru alloys, e.g., RuCr, RuPt and RuCo, Rh alloys, Re alloys, Os alloys, Cu alloys, Ni oxides, Fe oxides, Cr oxides, Cu oxides, Pt, Pd and Ta can be used. Mn alloys, Ru alloys, Cu oxides, Cr oxides, Pt, Pd and Ta are particularly preferred from the viewpoint of recording characteristics.

When materials having a great film stress are used as an intermediate layer, a support deforms and, at the same time, the adhesion with a recording layer is deteriorated. Accordingly, the film stress is preferably 5 GPa/$\mu$m or less.

The thickness of an intermediate layer is preferably from 1 to 30 nm, and particularly preferably from 3 to 10 nm. When the thickness is greater than this range, not only the productivity lowers and the adhesion with a recording layer is deteriorated but also the dia-ferromagnetic connection between a first recording layer and a second recording layer cannot be obtained. When the thickness is thinner than the above range, the effect of the intermediate layer cannot be obtained and apparent magnetic layer thickness increases, which causes the increase of noise.

As methods of forming an intermediate layer, vacuum film-forming methods, e.g., a vacuum evaporation method and a sputtering method, can be used. Of these methods, a sputtering method is preferably used in the invention, since a thin film having a good quality can be formed easily. As the sputtering method, any of well-known DC sputtering method and RF sputtering method can be used. In sputtering methods, a web sputtering apparatus of continuously forming a layer on a continuous film is preferably used in the case of a flexible disc using a flexible polymer support, and a batch sputtering system and an in-line sputtering system as used in the case where an Al support and a glass support are used can also be used.

As sputtering gases in sputtering an intermediate layer, ordinarily used argon gas can be used, but other rare gases may also be used. A trace amount of oxygen gas may be introduced for the purpose of controlling the lattice constant of the intermediate layer and the relaxation of film stress.

It is preferred to provide an undercoat layer for controlling the crystal orientation of a magnetic layer. As such an undercoat layer, Cr series, Ru series, and Ti series alloys can be used, but other alloys can also be used. Since the orientation of a recording layer can be improved by using an undercoat layer, recording characteristics are improved.

As the Cr series alloys, alloys containing Cr and at least one element selected from Co, Be, Os, Re, Ti, Zn, Ta, Al, Ru, Mo, V, W, Fe, Sb, Ir, Rh, Pt, Pd, Si and Zr are preferred, but Cr alloys containing other elements may also be used.

The mixing ratio of Cr to other elements in the Cr alloys, i.e., Cr/other elements, is preferably from 99/1 to 50/50 (atomic ratio).

As the Ru series alloys, alloys containing Ru and at least one element selected from Co, Be, Os, Re, Ti, Zn, Ta, Al, Cr, Mo, W, Fe, Sb, Ir, Rh, Pt, Pd, Si and Zr are preferred, but Ru alloys containing other elements may also be used.

The mixing ratio of Ru to other elements in the Ru alloys, i.e., Ru/other elements, is preferably from 99/1 to 50/50 (atomic ratio).

As the Ti series alloys, alloys containing Ti and at least one element selected from Co, Be, Os, Re, Cr, Zn, Ta, Al, Mo, W, V, Fe, Sb, Ir, Ru, Rh, Pt, Pd, Si and Zr are preferred, but Ti alloys containing other elements may also be used.

The mixing ratio of Ti to other elements in the Ti alloys, i.e., Ti/other elements, is preferably from 99/1 to 50/50 (atomic ratio).

An undercoat layer has a thickness of preferably from 10 to 200 nm, and particularly preferably from 10 to 100 nm. When the thickness is greater than this range, not only productivity lowers but a crystal grain enlarges, as a result, noise increases. While when the thickness is smaller than this range, the improvement of magnetic characteristics by the effect of an undercoat layer cannot be obtained.

As methods of forming an undercoat layer, vacuum film-forming methods, e.g., a vacuum evaporation method and a sputtering method, can be used. Of these methods, a sputtering method is preferably used in the invention, since a thin film having a good quality can be formed easily. As the sputtering method, any of well-known DC sputtering method and RF sputtering method can be used. In sputtering methods, a web sputtering apparatus of continuously forming a layer on a continuous film is preferably used in the case of a flexible disc using a flexible polymer support, and a batch sputtering system and an in-line sputtering system as used in the case where an Al support and a glass support are used can also be used.

As sputtering gases in sputtering an undercoat layer, ordinarily used argon gas can be used, but other rare gases may also be used. A trace amount of oxygen gas may be introduced for the purpose of controlling the lattice constant of the undercoat layer and the relaxation of film stress.

An electrically conductive layer is generally provided between a subbing layer and an undercoat layer. As an electrically conductive layer, electrically conductive layers having an electric resistivity of from 0 to 5 Ω·m can be used for the purpose of improving the adhesion of a subbing layer with an undercoat layer, controlling the crystal orientation of a recording layer, in addition to securing electric conduction of a magnetic recording medium. Electric resistivity can be measured with an electric resistivity meter of four terminals.

As the alloys for use in such an electrically conductive layer, alloys containing at least one element selected from Ti, Al, Cu, Ag, Ni, Pd, Pt, Mn, Zn, Ge, Sn, Pb and Au can be used, but alloys containing other elements may also be used.

An electrically conductive layer has a thickness of preferably from 10 to 200 nm, and particularly preferably from 10 to 100 nm. When the thickness is greater than this range, not only productivity lowers but a crystal grain enlarges, as a result, noise increases. While when the thickness is smaller than this range, the improvement of magnetic characteristics by the effect of an electrically conductive layer and electric conduction which is necessary for forming a hard protective layer by a CVD method cannot be obtained.

As methods of forming an electrically conductive layer, vacuum film-forming methods, e.g., a vacuum evaporation method and a sputtering method, can be used. Of these methods, a sputtering method can easily form a good thin film.

A flexible support can avoid the impact at the time when a magnetic head and a magnetic disc are brought into contact. A flexible support preferably comprises a resin film having flexibility (a flexible polymer support). As such resin films, resin films comprising aromatic polyimide, aromatic polyamide, aromatic polyamideimide, polyether ketone, polyether sulfone, polyether imide, polysulfone, polyphenylene sulfide, polyethylene naphthalate, polyethylene terephthalate, polycarbonate, triacetate cellulose, and a fluorine resin are exemplified. Since good recording characteristics can be obtained in the present invention without heating a support, polyethylene terephthalate and polyethylene naphthalate are particularly preferably used from the viewpoint of the cost and the surface property.

Further, as a flexible support, a laminated film comprising a plurality of resin films may be used. By using a laminated film, warpage and undulation attributable to a support itself can be reduced, thus the scratch resistance of a magnetic recording medium can be markedly improved.

As methods of lamination, roll lamination by heat roller, lamination by flat sheet heat press, dry lamination by coating an adhesive on the surface to be adhered, and lamination using an adhesive sheet previously formed in the form of sheet are exemplified. The kind of adhesive is not particularly restricted, and generally used adhesives, e.g., a hot melt adhesive, a thermosetting adhesive, an UV-curable adhesive, an EB-curable adhesive, an adhesive sheet, and an anaerobic adhesive can be used.

A flexible support has a thickness of from 10 to 200 µm, preferably from 20 to 150 µm, and more preferably from 30 to 100 µm. When the thickness of a flexible support is thinner than 10 µm, the stability at high speed rotation lowers and the run out (vertical vibration) increases. On the other hand, when the thickness of a flexible support is thicker than 200 µm, the stiffness at rotation increases and it becomes difficult to avoid the impact at the time when a magnetic head and a magnetic disc are brought into contact, which causes jumping of a magnetic head.

The nerve of a flexible support is represented by the following equation, and the value at the time when b=10 mm is preferably from 0.5 to 2.0 kgf/mm$^2$ (=about 4.9 to 19.6 MPa), and more preferably from 0.7 to 1.5 kgf/mm$^2$ (=about 6.9 to 14.7 MPa):

$$\text{Nerve of flexible support} = Ebd^3/12$$

wherein E represents Young's modulus, b represents a film width, and d represents a film thickness.

The surface of a flexible support is preferably as smooth as possible for performing recording by magnetic heads. The unevenness of the surface of a flexible support conspicuously degrade the recording and reproducing characteristics of signals. Specifically, when a subbing layer described later is used, the central plane average surface roughness SRa measured by an optical surface roughness meter is 5 nm or less, and preferably 2 nm or less, and the pimple height measured by a feeler type surface roughness meter is 1 µm or less, and preferably 0.1 µm or less. When a subbing layer is not used, the central plane average surface roughness SRa measured by an optical surface roughness meter is 3 nm or less, and preferably 1 nm or less, and the pimple height measured by a feeler type surface roughness meter is 0.1 µm or less, and preferably 0.06 µm or less.

It is preferred to form a subbing layer on the surface of a flexible support for the purpose of improving a surface property and a gas barrier property. For forming a magnetic layer by sputtering, it is preferred that a subbing layer is excellent in heat resistance, and as the materials of a subbing layer, e.g., polyimide resins, polyamideimide resins, silicone resins and fluorine resins can be used. Thermosetting polyimide resins and thermosetting silicone resins have a high smoothing effect and particularly preferred. A subbing layer has a thickness of preferably from 0.1 to 3.0 µm. When other resin films are laminated on a flexible support, a subbing layer may be formed before lamination processing, or a subbing layer may be formed after lamination processing.

As the thermosetting polyimide resins, polyimide resins which are obtained by thermally polymerizing an imide monomer having two or more terminal unsaturated groups in the molecule, e.g., bisallylnadiimide "BANI", manufactured by Maruzen Petrochemical Co., Ltd., are preferably used. This imide monomer can be thermally polymerized at a relatively low temperature after being coated in the state of monomer on the surface of a flexible support, and so the material monomer can be directly coated on a flexible support and hardened. The imide monomer can be used by being dissolved in general purpose solvents, is excellent in productivity and working efficiency, has a small molecular weight, and the solution of the imide monomer is low in viscosity, so that it gets into the unevenness well in coating and is excellent in smoothing effect.

As the thermosetting silicone resins, silicone resins obtained by polymerization by a sol-gel method with silicon compounds having introduced an organic group as the starting material are preferably used. The silicone resins have a structure in which a part of the silicon dioxide bonding is substituted with an organic group, and the resins are greatly excellent in heat resistance as compared with silicon rubbers and more flexible than silicon dioxide films, therefore, cracking and peeling are hardly generated when a resin film is formed on a flexible support comprising a flexible film. Further, since the starting material monomers can be directly coated on a flexible support and hardened, a general purpose solvent can be used, the resins get into the unevenness well, and smoothing effect is high. Since condensation polymerization reaction advances from comparatively low temperature by the addition of a catalyst such as an acid and a chelating agent, hardening can be expedited, and a resin film can be formed with a general purpose coating apparatus. Further, thermosetting silicone resins are excellent in a gas barrier property and shield gases which are generated from a flexible support when a magnetic layer is formed and hinder the crystallizability and orientation of the magnetic layer and the undercoat layer, so that they can be particularly preferably used.

It is preferred to provide minute pimples (texture) on the surface of a subbing layer for the purpose of reducing the true contact area of a magnetic head and a magnetic disc and improving a sliding property. Further, the handling property of a flexible support can be improved by providing minute pimples. As methods of forming minute pimples, a method of coating spherical silica particles and a method of coating an emulsion to thereby form the pimples of an organic substance can be used, and a method of coating spherical silica particles is preferred for ensuring the heat resistance of a subbing layer.

The height of minute pimples is preferably from 5 to 60 nm, and more preferably from 10 to 30 nm. When the height of minute pimples is too high, the recording and reproducing characteristics of signals are deteriorated due to the spacing loss between recording/reproducing heads and the medium, and when the height of minute pimples is too low, the improving effect of a sliding property decreases. The density of minute pimples is preferably from 0.1 to 100/$\mu$m$^2$, and more preferably from 1 to 10/$\mu$m$^2$. When the density of minute pimples is too low, the improving effect of a sliding property decreases, while when it is too high, high pimples increase by the increase of agglomerated particles, and recording and reproducing characteristics are degraded.

Further, minute pimples can also be fixed on the surface of a flexible support by a binder. It is preferred to use resins having sufficient heat resistance as the binder. As the resins having heat resistance, solvent-soluble polyimide resins, thermosetting polyimide resins and thermosetting silicone resins are particularly preferably used.

A protective layer is provided for the purpose of preventing the corrosion of metallic materials contained in a magnetic layer, preventing the abrasion of a magnetic layer by the pseudo-contact or sliding by contact of a magnetic head and a magnetic disc, to thereby improve running durability and corrosion resistance. In a protective layer, materials, such as silica, alumina, titania, zirconia, oxides, e.g., cobalt oxide and nickel oxide, nitrides, e.g., titanium nitride, silicon nitride and boron nitride, carbides, e.g., silicon carbide, chromium carbide and boron carbide, and carbons, e.g., graphite and amorphous carbon can be used.

A protective layer is a hard film having a hardness equal to or higher than that of the material of a magnetic head, and those which hardly cause burning during sliding and stably maintain the effect are preferred, since such hard films are excellent in sliding durability. At the same time, those which have less pinholes are excellent in corrosion resistance and preferred. As such a protective layer, a hard carbon film called DLC (diamond-like carbon) manufactured by a CVD method is exemplified.

It is possible to form a DLC protective layer by using an electrically conductive layer having sufficient electric conduction while applying bias voltage by a CVD method.

A protective layer can be formed by laminating two or more thin films each having different property. For example, it becomes possible to reconcile corrosion resistance and durability on a high level by providing a hard carbon protective layer for improving sliding characteristics on the surface side and a nitride protective layer, e.g., silicon nitride, for improving corrosion resistance on the magnetic recording layer side.

A lubricating layer is provided on a protective layer for improving running durability and corrosion resistance. Lubricants, e.g., well-known hydrocarbon lubricants, fluorine lubricants and extreme-pressure additives are used in a lubricating layer.

The examples of the hydrocarbon lubricants include carboxylic acids, e.g., stearic acid and oleic acid, esters, e.g., butyl stearate, sulfonic acids, e.g., octadecylsulfonic acid, phosphoric esters, e.g., monooctadecyl phosphate, alcohols, e.g., stearyl alcohol and oleyl alcohol, carboxylic acid amides, e.g., stearic acid amide, and amines, e.g., stearylamine.

The examples of the fluorine lubricants include lubricants obtained by substituting a part or all of the alkyl groups of the above hydrocarbon lubricants with a fluoroalkyl group or a perfluoro polyether group. The examples of the perfluoro polyether groups include a perfluoromethylene oxide polymer, a perfluoroethylene oxide polymer, a perfluoro-n-propylene oxide polymer [(CF$_2$CF$_2$CF$_2$O)$_n$], a perfluoroisopropylene oxide polymer [(CF(CF$_3$)CF$_2$O)$_n$], and copolymers of these polymers. Specifically, a perfluoromethylene-perfluoroethylene copolymer having hydroxyl groups at terminals (FOMBLIN Z-DOL, trade name, manufactured by Audimont Co.) is exemplified.

As the extreme-pressure additives, phosphoric esters, e.g., trilauryl phosphate, phosphorous esters, e.g., trilauryl phosphite, thiophosphorous esters, e.g., trilauryl trithiophosphite, thiophosphoric esters, and sulfur series extreme-pressure additives, e.g., dibenzyl disulfide, are exemplified.

These lubricants can be used alone or a plurality of lubricants can be used in combination. A lubricating layer can be formed by coating a solution obtained by dissolving a lubricant in an organic solvent on the surface of a protective layer by spin coating, wire bar coating, gravure coating, or dip coating, or depositing the coating solution on the surface of a protective layer by vacuum deposition. The coating amount of lubricants is preferably from 1 to 30 mg/m$^2$, and particularly preferably from 2 to 20 mg/m$^2$.

It is also preferred to use a rust preventive in combination for increasing corrosion resistance. The examples of the rust preventives include nitrogen-containing heterocyclic rings, e.g., benzotriazole, benzimidazole, purine, and pyrimidine, derivatives obtained by introducing alkyl side chains to the mother nuclei of the above nitrogen-containing heterocyclic rings, nitrogen- and sulfur-containing heterocyclic rings, e.g., benzothiazole, 2-mercaptobenzothiazole, tetraazaindene ring compounds, and thiouracyl compounds, and derivatives of these nitrogen- and sulfur-containing heterocyclic rings. These rust preventives may be mixed with lubricants and then coated on a protective layer, alternatively they may be coated on a protective layer before coating lubricants, and then lubricants may be coated thereon. The coating amount of rust preventives is preferably from 0.1 to 10 mg/m$^2$, and particularly preferably from 0.5 to 5 mg/m$^2$.

An example of manufacturing method of a magnetic recording medium using a flexible polymer support is described below.

A forming method of a layer, e.g., a recording layer, on a flexible polymer support with a film-forming apparatus is described.

A film-forming apparatus has a vacuum chamber, and argon gas is fed in a prescribed amount from a gas-feeding pipe by a vacuum pump under a prescribed reduced pressure. A flexible polymer support is unrolled from a let-off roll, the tension is controlled by a tension controlling roll, and an electrically conductive layer, an undercoat layer, a first recording layer, an intermediate layer and a second recording layer are formed successively on the support by the target of film-forming sputtering apparatus of each of an electrically conductive layer, an undercoat layer, a first recording layer, an intermediate layer and a second recording layer, while moving the flexible polymer support along the film-forming roll.

In the next place, each layer is formed on the support in the same manner as above by moving the support along a second film-forming roll with the opposite side of the support having the recording layer facing a second film-forming roll.

Recording layers are provided on both sides of the flexible polymer support by the above process, and the support is wound-up by a wind-up roll.

Further, a method of forming recording layers on both sides of the flexible polymer support was described above, but a recording layer may be provided on only one side by the same process.

After a recording layer has been formed, a protective layer including diamond-like carbon is formed on the recording layer by a CVD method.

An example of CVD apparatus making use of high frequency plasma which can be applied to the invention is described below. A flexible polymer support provided with a recording layer is unrolled from a let-off roll, bias voltage is fed to the recording layer from a bias electric source by a pass roller, and the flexible polymer support is transferred along the film-forming roll.

On the other hand, material gas containing hydrocarbon, nitrogen and rare gas forms a carbon protective layer containing nitrogen and rare gas on the recording layer on the film-forming roll by the plasma generated by the voltage applied from the high frequency electric source, and the support is wound-up by a wind-up roll. Further, adhesion is markedly improved by subjecting the recording layer surface to cleaning by glow discharge treatment with rare gas and hydrogen gas before forming a carbon protective layer. Adhesion is further increased by providing a silicon intermediate layer on the surface of the recording layer.

EXAMPLES

The present invention is described below with reference to specific examples, but the present invention should not be construed as being limited thereto.

Example 1

A subbing layer coating solution comprising 3-glycidoxypropyltrimethoxysilane, phenyltriethoxysilane, hydrochloric acid, aluminum acetylacetonate and ethanol was coated on a polyethylene naphthalate film having a thickness of 63 $\mu$m and a surface roughness (Ra) of 1.4 nm by gravure coating, and the coated layer was dried and hardened at 100° C., thereby a subbing layer having a thickness of 1.0 $\mu$m comprising a silicone resin was formed. A coating solution obtained by mixing silica sol having a particle size of 25 nm and the above subbing layer coating solution was coated on the subbing layer by gravure coating, thereby pimples having a height of 15 nm were formed on the subbing layer in the density of 10/$\mu$m$^2$. The subbing layer was formed on both sides of the flexible support film. The raw web was mounted on a web sputtering apparatus and the following layers were coated on the subbing layer by DC magnetron sputtering method while moving with keeping in contact with a can cooled with water; an electrically conductive layer comprising Ti in a thickness of 30 nm, an undercoat layer comprising (Cr/Ru=90/10 in atomic ratio, i.e., $Cr_{90}Ru_{10}$, hereinafter the same) in a thickness of 40 nm, a first recording layer comprising [(Co/Pt/Cr=70/20/10 in atomic ratio)/SiO$_2$=88/12 (atomic ratio), i.e., $(CO_{70}Pt_{20}Cr_{10})_{88}/(SiO_2)_{12}$] in a thickness of 10 nm, an intermediate layer comprising $Ru_{90}Cr_{10}$, and a second recording layer comprising $(CO_{70}Pt_{20}Cr_{10})_{88}/(SiO_2)_{12}$ in a thickness of 20 nm. These electrically conductive layer, undercoat layer, first recording layer, intermediate layer and second recording layer were formed on both sides of the flexible support film. Subsequently, the raw web was mounted on a web type CVD apparatus, and a nitrogen-added DLC protective layer comprising C/H/N of 62/29/7 in molar ratio was formed in a thickness of 10 nm by an RF plasma CVD method using ethylene gas, nitrogen gas and argon gas as reaction gases. At this time, bias voltage of −500 V was applied to the magnetic layer. The protective layer was also provided on both sides of the film. A lubricating layer having a thickness of 1 nm was formed on the protective layer surface by coating a solution obtained by dissolving a perfluoro polyether lubricant having hydroxyl groups at molecule terminals (FOMBLIN Z-DOL, manufactured by Montefluos Co.) in a fluorine lubricant (HFE-7200, manufactured by Sumitomo 3M Limited) by gravure coating. The lubricating layer was also formed on both sides of the film. A 3.7 inch size disc was punched out of the raw web, subjected to tape burnishing treatment, and built into a resin cartridge (for Zip100, manufactured by Fuji Photo Film Co., Ltd.), thereby a flexible disc was obtained.

Example 2

A disc-like sheet having a diameter of 130 mm was punched out of the raw web in Example 1 having formed thereon a subbing layer and fixed on a circular ring. The same electrically conductive layer, undercoat layer and recording layers as in Example 1 were coated on both sides of the sheet by a batch sputtering apparatus, further the DLC protective layer was formed by the CVD apparatus. The same lubricating layer as in Example 1 was formed on the sheet by dip coating. A 3.7 inch size disc was punched out of the sheet, subjected to tape burnishing treatment, and built into a resin cartridge (for Zip100, manufactured by Fuji Photo Film Co., Ltd.), thereby a flexible disc was obtained.

Examples 3 to 11

Flexible discs were produced in the same manner as in Example 1 except for forming the intermediate layer shown in Table 1 below.

TABLE 1

| Example No. | Intermediate Layer | Gas in Film Formation |
| --- | --- | --- |
| Example 3 | $Ru_{90}Cr_{10}$ | Ar + O$_2$ |
| Example 4 | $Ru_{80}Cr_{20}$ | Ar |
| Example 5 | $Ru_{80}Cr_{20}$ | Ar + O$_2$ |
| Example 6 | $Mn_{90}Pt_{10}$ | Ar |
| Example 7 | Cu—O | Ar + O$_2$ |
| Example 8 | $Cr_2O_3$ | Ar + O$_2$ |
| Example 9 | $Mn_{50}Cu_{50}$ | Ar |

TABLE 1-continued

| Example No. | Intermediate Layer | Gas in Film Formation |
|---|---|---|
| Example 10 | $Cu_{50}Ti_{50}$ | Ar |
| Example 11 | Ni—O | Ar + $O_2$ |
| Example 12 | Pt | Ar |
| Example 13 | Pd | Ar |
| Example 14 | Ta | Ar |

Comparative Example 1

A hard disc was produced in the same manner as in Example 1 except that the flexible support used in Example 1 was replaced with a specularly polished 3.7 inch glass support. A subbing layer was not provided, and the disc obtained was not encased in a cartridge.

Comparative Example 2

A flexible disc was prepared in the same manner as in Example 1 except that the composition of the first and second recording layers was changed from $(Co_{70}Pt_{20}Cr_{10})_{88}$—$(SiO_2)_{12}$ to $Co_{70}Pt_{20}Cr_{10}$.

Comparative Example 3

A flexible disc was prepared in the same manner as in Example 1 except for excluding the intermediate layer and the second recording layer.

The above-obtained samples were evaluated as follows. The results obtained are shown in Table 2 below.

(1) Magnetic Characteristics

Coercive force (Hc) was measured by VSM.

(2) Run Out (Vertical Vibration)

Each of the above flexible discs and hard discs was rotated at 3,000 rpm, and the run out of each disc at the radial position of 35 mm was measured by a laser displacement gauge.

(3) C/N Ratio

Recording and reproduction of linear recording density of 130 kFCI were performed with an MR head having a reproduction track width of 1.3 μm and a reproduction gap of 0.26 μm, and the ratio of reproduction signal to noise (C/N ratio) was measured. In the measurement, the engine speed was 3,000 rpm, the radial position was 35 mm, and the head load was 3 gf. Taking the C/N value in Example 1 as a criterion, and each value was shown as the increase or decrease from the criterion.

(4) Modulation (MDN)

The reproduction output in the measurement of C/N ratio was measured with one round of the disc (envelope), and min/max ratio of the output was measured.

(5) Signal Output Reduction by Thermal Fluctuation

Each flexible disc which recorded a signal of track width of 0.8 μm was preserved under the atmosphere of 60° C. 50% RH for one week. The recorded signal was reproduced by the MR head and the reduction of the signal output was measured.

TABLE 2

| Example No. | Hc (kA/m) | Run out (μm) | C/N Ratio (dB) | MDN (%) | Reduction of Signal Output (dB) |
|---|---|---|---|---|---|
| Example 1 | 250 | 30 | 0 | 94 | −0.2 |
| Example 2 | 255 | 30 | +1.0 | 95 | 0 |
| Example 3 | 300 | 25 | +1.4 | 95 | −0.2 |
| Example 4 | 280 | 30 | +0.8 | 90 | 0 |
| Example 5 | 275 | 20 | +1.2 | 94 | 0 |
| Example 6 | 280 | 30 | +1.4 | 95 | 0 |
| Example 7 | 260 | 20 | +1.2 | 96 | −0.4 |
| Example 8 | 267 | 19 | +0.8 | 97 | −0.3 |
| Example 9 | 280 | 20 | +0.2 | 96 | −0.1 |
| Example 10 | 280 | 35 | +0.6 | 90 | 0 |
| Example 11 | 271 | 30 | +0.4 | 94 | −0.2 |
| Example 12 | 295 | 30 | +0.6 | 92 | 0 |
| Example 13 | 287 | 30 | +0.4 | 94 | −0.1 |
| Example 14 | 249 | 25 | −0.2 | 95 | 0 |
| Comparative Example 1 | 250 | 10 | −1.0 | 97 | −0.3 |
| Comparative Example 2 | 140 | 30 | −6.6 | 94 | 0 |
| Comparative Example 3 | 230 | 35 | −1.0 | 95 | −6.6 |

As can be understood from the results in Table 2, the flexible discs in the present invention are excellent both in recording characteristics and the reduction of thermal fluctuation. On the other hand, in the similarly produced flexible disc in Comparative Example 1 using a glass support in place of a flexible support, the C/N ratio is slightly reduced from that of the sample in Example 1. The reason for this is that the output is relatively reduced, and it is thought due to the fact that the floating height of the hard disc is higher than that of the flexible disc. In the sample of Comparative Example 2 in which a nonmagnetic oxide ($SiO_2$) is not used, the coercive force lowers and the recording characteristics are low. In Comparative Example 3 where an intermediate layer and a second recording layer are excluded, the sample is influenced by thermal fluctuation and the output is greatly reduced.

According to the present invention, a magnetic recording medium which can be preferably used in high density magnetic recording apparatus, is less in the interaction among ferromagnetic particles, is low in noise and high in signal stability can be manufactured inexpensively.

This application is based on Japanese Patent application JP 2002-149407, filed May 23, 2002, the entire content of which is hereby incorporated by reference, the same as if set forth at length.

What is claimed is:

1. A magnetic recording medium comprising a polymer support having a thickness of about 10 to 200 μm, a first recording layer, an intermediate layer and a second recording layer in this order, wherein the second recording layer comprises a ferromagnetic metal alloy comprising Co, Pt and Cr, and a nonmagnetic oxide.

2. The magnetic recording medium according to claim 1, wherein the ferromagnetic metal alloy comprises Co, Pt and Cr, and at least one of Ni, Fe, B, Si, Ta, Nb and Ru.

3. The magnetic recording medium according to claim 1, wherein the ferromagnetic metal alloy comprises a combination selected from: Co, Pt and Cr; Co, Pt, Cr and Ta; and Co, Pt, Cr and B.

4. The magnetic recording medium according to claim 1, wherein the nonmagnetic oxide comprises at least one of Si, Zr, Ta, B, Ti, Al, Cr, Ba, Zn, Na, La, In and Pb.

5. The magnetic recording medium according to claim 1, wherein the nonmagnetic oxide comprises Si.

6. The magnetic recording medium according to claim 1, wherein the intermediate layer comprises at least one of: an alloy comprising Mn; an alloy comprising Ru; an oxide comprising Cu; Cr; Pt; Pd; and Ta.

7. The magnetic recording medium according to claim 1, further comprising an undercoat layer so that the flexible support, the undercoat layer and the first recording layer are in this order, wherein the undercoat layer comprises an alloy comprising at least one of Cr, Ru and Ti.

8. The magnetic recording medium according to claim 7, further comprising an electrically conductive layer so that the electrically conductive layer, the undercoat layer, and the first recording layer are in this order, wherein the electrically conductive layer has an electric resistivity of from 0 to 5 $\Omega \cdot m$.

9. The magnetic recording medium according to claim 1, wherein the second recording layer comprises the ferromagnetic metal alloy and the nonmagnetic oxide in an atomic ratio of 95/5 to 80/20.

10. The magnetic recording medium according to claim 1, wherein the second recording layer comprises the ferromagnetic metal alloy and the nonmagnetic oxide in an atomic ratio of 90/10 to 85/15.

11. The magnetic recording medium according to claim 1, wherein the support is at least one resin chosen from aromatic polyimide, aromatic polyamide, aromatic polyamideimide, polyether ketone, polyether sulfone, polyether imide, polysulfone, polyphenylene sulfide, polyethylene naphthalate, polyethylene terephthalate, polycarbonate, triacetate cellulose, and/or a fluorine resin.

12. The magnetic recording medium according to claim 1, wherein the magnetic layer further comprises a subbing layer so that the support, the subbing layer and the first recording layer, in this order, and the subbing layer comprising at least one resin chosen from polyimide resins, polyamideimide resins, silicone resins and fluorine resins.

13. The magnetic recording medium according to claim 1, wherein the magnetic recording medium further comprises a subbing layer so that the support, the subbing layer, and the first recording layer, in this order, and the subbing layer containing one of thermosetting polyimide resins and thermosetting silicone resins.

14. The magnetic recording medium according to claim 13, wherein the surface of the subbing layer has pimples.

15. The magnetic recording medium according to claim 14, wherein the pimple is silica particles or an emulsion.

16. The magnetic recording medium according to claim 14, wherein the pimple has a height of 5 to 60 nm.

17. The magnetic recording medium according to claim 14, wherein the density of the pimples is from 0.1 to $100/\mu m^2$.

18. The magnetic recording medium according to claim 1, wherein the magnetic recording medium further comprises an undercoat layer comprising an alloy comprising Ru and at least one element selected from Co, Be, Os, Re, Ti, Zn, Ta, Cr, Mo, W, Fe, Sb, Ir, Rh, Pt, Pd, Si, and Zr.

* * * * *

UNITED STATES PATENT AND TRADEMARK OFFICE
CERTIFICATE OF CORRECTION

PATENT NO. : 6,875,505 B2
DATED : April 5, 2005
INVENTOR(S) : Moriwaki et al.

It is certified that error appears in the above-identified patent and that said Letters Patent is hereby corrected as shown below:

<u>Title page,</u>
Item [75], Inventors, delete "Kazuyuki Usui" and insert -- Kazuyuki Usuki --.

Signed and Sealed this

Eighth Day of November, 2005

JON W. DUDAS
*Director of the United States Patent and Trademark Office*